US012649306B2

(12) United States Patent
Takebayashi

(10) Patent No.: US 12,649,306 B2
(45) Date of Patent: Jun. 9, 2026

(54) METHOD FOR MANUFACTURING IMAGE DISPLAY DEVICE

(71) Applicant: DEXERIALS CORPORATION, Shimotsuke (JP)

(72) Inventor: Yuko Takebayashi, Shimotsuke (JP)

(73) Assignee: Dexerials Corporation, Shimotsuke (JP)

( * ) Notice: Subject to any disclaimer, the term of this patent is extended or adjusted under 35 U.S.C. 154(b) by 453 days.

(21) Appl. No.: 17/908,266

(22) PCT Filed: Mar. 2, 2021

(86) PCT No.: PCT/JP2021/008007
§ 371 (c)(1),
(2) Date: Aug. 31, 2022

(87) PCT Pub. No.: WO2021/177320
PCT Pub. Date: Sep. 10, 2021

(65) Prior Publication Data
US 2023/0118965 A1    Apr. 20, 2023

(30) Foreign Application Priority Data

Mar. 3, 2020    (JP) ................................. 2020-035875
Jan. 22, 2021    (JP) ................................. 2021-009137

(51) Int. Cl.
*B32B 37/12*        (2006.01)
*B32B 37/02*        (2006.01)
(Continued)

(52) U.S. Cl.
CPC .............. *B32B 37/12* (2013.01); *B32B 37/02* (2013.01); *C09J 5/00* (2013.01); *C09J 133/04* (2013.01);
(Continued)

(58) Field of Classification Search
CPC . B32B 37/12; B32B 37/02; B32B 2037/1253; B32B 2457/206; G02F 1/133331; C09D 11/30
See application file for complete search history.

(56) References Cited

U.S. PATENT DOCUMENTS

2009/0183819 A1*   7/2009   Matsuhira ......... G02F 1/133308
                                                              156/99
2012/0306030 A1*  12/2012   Kornilovich .......... B05B 12/084
                                                              106/31.13
(Continued)

FOREIGN PATENT DOCUMENTS

CN        109843562  A      6/2019
JP        2009175701  A      8/2009
(Continued)

OTHER PUBLICATIONS

Kaneko (English Translation of JP 2018076496) (Year: 2018).*
(Continued)

*Primary Examiner* — Michael A Tolin
*Assistant Examiner* — Hana C Page
(74) *Attorney, Agent, or Firm* — Element IP, PLC

(57) ABSTRACT

A method for manufacturing an image display device includes applying a first photo-curable resin composition to a protective panel to form a first photo-curable resin composition layer. The first photo-curable resin composition layer is irradiated with curing light to form a first cured resin layer. A second photo-curable resin composition is applied to the first cured resin layer to form a second photo-curable resin composition layer. The second photo-curable resin composition layer has a reduced or eliminated height difference, compared with the first photo-curable resin composition layer. The protective panel and an image display member are laminated via the second photo-curable resin
(Continued)

composition layer. The second photo-curable resin composition layer is irradiated with curing light.

8 Claims, 11 Drawing Sheets

(51) Int. Cl.
  *C09J 5/00*  (2006.01)
  *C09J 133/04*  (2006.01)
  *G02F 1/1333*  (2006.01)
(52) U.S. Cl.
  CPC .................. *G02F 1/133331* (2021.01); *B32B 2037/1253* (2013.01); *B32B 2457/202* (2013.01); *C09J 2433/00* (2013.01); *G02F 2202/28* (2013.01)

(56) References Cited

U.S. PATENT DOCUMENTS

| | | | | |
|---|---|---|---|---|
| 2013/0034713 A1* | 2/2013 | Busman | ............ | G02F 1/133308 156/60 |
| 2014/0069581 A1* | 3/2014 | Ogawa | ..................... | G02B 1/14 156/275.5 |
| 2014/0118902 A1* | 5/2014 | Kim | .................. | G02F 1/133308 361/679.01 |
| 2014/0211105 A1* | 7/2014 | Cho | ................... | G02F 1/13338 156/60 |
| 2018/0201808 A1* | 7/2018 | Sugawara | ................. | B32B 7/12 |

FOREIGN PATENT DOCUMENTS

| | | |
|---|---|---|
| JP | 5138820 B1 | 2/2013 |
| JP | 2013152339 A | 8/2013 |
| JP | 2017009780 A | 1/2017 |
| JP | 2017045010 A | 3/2017 |
| JP | 2017161939 A | 9/2017 |
| JP | 2018076496 A | 5/2018 |
| JP | 2018128668 A | 8/2018 |
| KR | 1020140096596 A | 8/2014 |
| KR | 1020170134842 A | 12/2017 |
| KR | 1020190073820 A | 6/2019 |
| TW | 201348752 A | 12/2013 |

OTHER PUBLICATIONS

Matsudaira (English Translation of JP 2009/175701) (Year: 2009).*
Written Opinion issued May 18, 2021 in PCT/JP2021/008007 (with English translation), 12 pages.
Office Action issued Jul. 30, 2024 in corresponding Japanese Patent Application No. 2021-009137 (with English translation), 15 pages.
Office Action issued Jul. 23, 2024, in corresponding Chinese Patent Application No. 202180016324.2 (with English translation), 20 pages.
International Search Report issued May 18, 2021 in PCT/JP2021/008007 (with English translation), 6 pages.
Office Action issued Feb. 22, 2024 in Chinese Patent Application No. 202180016324.2 (with machine English translation), 17 pages.
Office Action issued Jul. 28, 2023 in Korean Patent Application No. 10-2022-7029245 (with English translation), 13 pages.
Combined Chinese Office Action and Search Report issued Sep. 27, 2023 in Patent Application No. 202180016324.2 (with English translation), 22 pages.
Office Action issued Sep. 16, 2025, in corresponding Taiwanese Patent Application No. 110107529 (with machine English translation), 5 pages.
Office Action issued Jul. 16, 2025, in corresponding European Patent Application No. 21764810.4, 7 pages.
Combined Taiwanese Office Action and Search Report issued Nov. 26, 2024, in corresponding Taiwanese Patent Application No. 110107529 (with machine English translation), 18 pages.
Office Action issued Jan. 7, 2025, in corresponding Japanese Patent Application No. 2021-009137 (with machine English translation), 15 pages.
Office Action issued Mar. 3, 2026, in corresponding Japanese Patent Application No. 2025-062433 (with English translation), 8 pages.

* cited by examiner

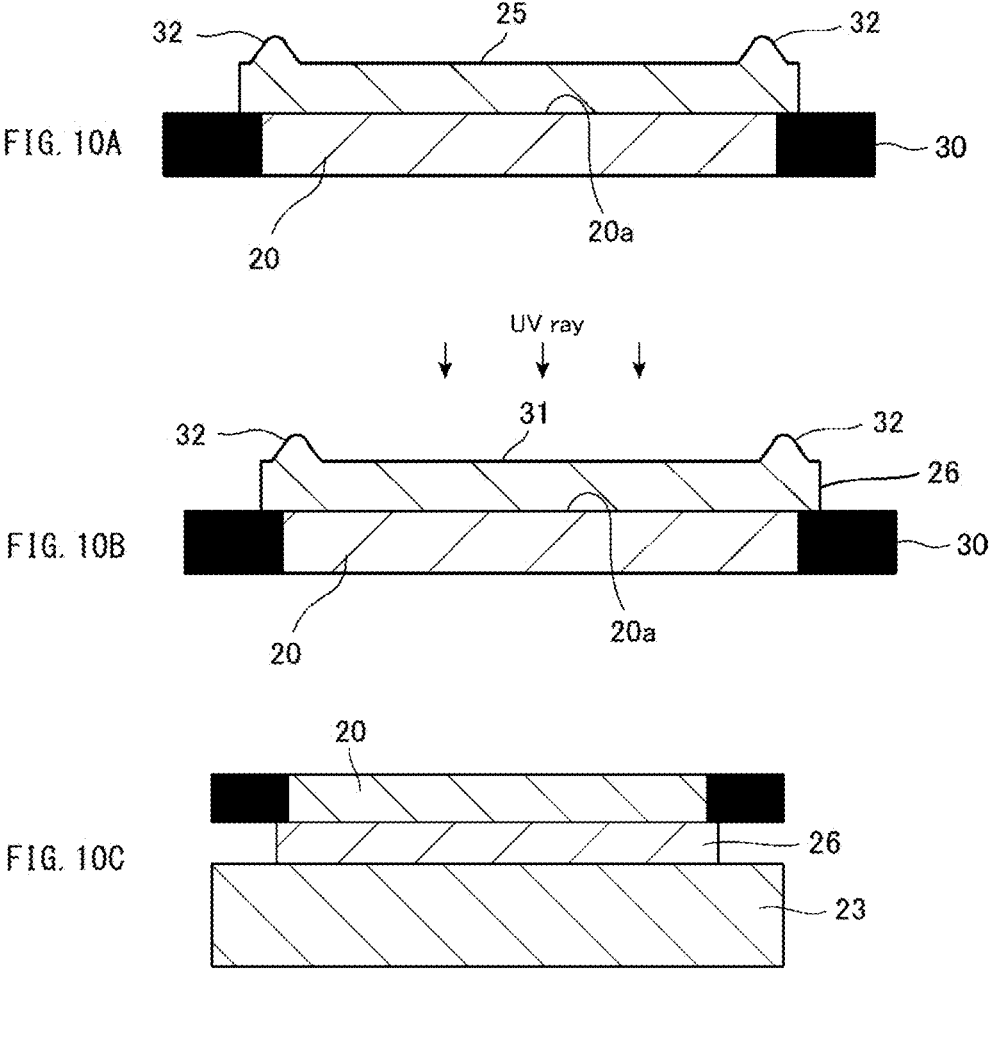
FIG. 10A
FIG. 10B
FIG. 10C
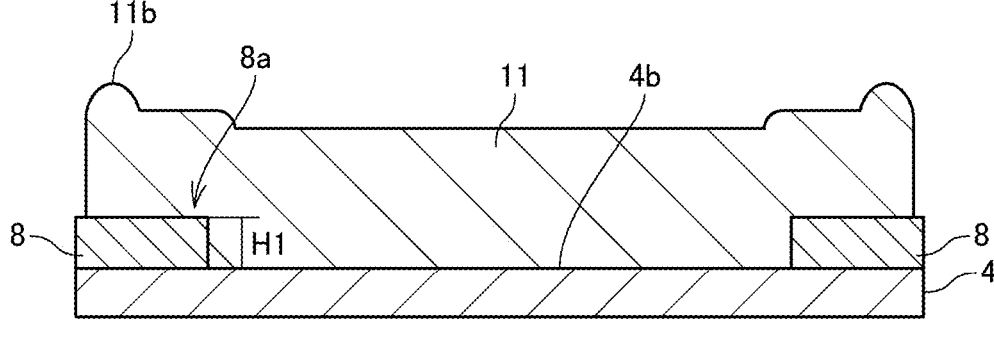
FIG. 11

METHOD FOR MANUFACTURING IMAGE DISPLAY DEVICE

TECHNICAL FIELD

The present technology relates to a method for manufacturing an image display device in which an image display member such as a liquid crystal display panel and a protective panel such as transparent protective glass arranged on the display surface side of the image display member are laminated via a photo-cured resin layer. This application claims priority on the basis of Japanese Patent Application Serial No. 2020-35875, filed Mar. 3, 2020, in Japan, and Japanese Patent Application Serial No. 2021-9137, filed Jan. 22, 2021, in Japan, which are incorporated herein by reference.

BACKGROUND ART

In an image display device such as a liquid crystal display panel used for an information terminal such as a smart phone or a car navigation device, a light-transmissive photo-cured resin layer is provided between an image display member such as a liquid crystal display panel or an organic EL panel and a light-transmissive protective panel such as a transparent protection glass for the purpose of thinning and improving visibility.

For example, a method for forming the photo-cured resin layer includes: applying a photo-curable resin composition to a protective panel to form a photo-curable resin composition layer; laminating an image display member such as a liquid crystal display panel or an organic EL panel via the photo-curable resin composition layer, and then curing the photo-curable resin composition layer (Patent Document 1).

As a method of applying the photo-curable resin composition to the protective panel, there have been used, e.g., a method in which the photo-curable resin composition is discharged from a moving slit nozzle to the surface of the transparent panel over the entire width. In this method, as shown in FIG. 9, a photo-curable resin composition 22 is discharged from the tip of the nozzle of an application head 24 onto a surface 20a of a light-transmissive protective panel 20 to be faced with an image display member 23, so that a substantially rectangular photo-curable resin composition layer 25 is formed with a predetermined thickness over the entire surface of the light-transmissive cover member 20, as shown in FIG. 10A.

Next, as shown in FIG. 10B, the photo-curable resin composition layer 25 formed on the surface 20a of the protective member 20 is irradiated with ultraviolet rays and temporarily cured to form a temporarily cured resin layer 26. The purpose of this temporary curing is to convert the photo-curable resin composition 22 from a liquid state to a state in which it does not flow remarkably, so that it does not flow down even if it is reversed from the top to the bottom, thereby improving the handleability.

Next, as shown in FIG. 10C, the protective member 20 is bonded to the image display member 23 from the side of the temporarily cured resin layer 26, and the temporarily cured resin layer 26 is final-cured by ultraviolet irradiation.

CITATION LIST

Patent Literature

Patent Document 1: Japanese Unexamined Patent Application Publication No. 2017-9780

SUMMARY OF INVENTION

Technical Problem

Here, in the photo-curable resin composition layer 25, a protruding portion 32 is formed on the outer edge of the protective panel 20, the protruding portion 32 being raised higher than the main surface portion 31 by the action of surface tension of the photo-curable resin composition 22. If the protruding portion 32 formed in the photo-curable resin composition layer 25 are high, air inclusion might occur between the protective panel 20 and the image display member 23 when the protective panel 20 and the image display member 23 are bonded together, resulting in bonding unevenness, image distortion, and color unevenness, thereby degrading image quality.

Therefore, when the photo-curable resin composition 22 is applied to the protective panel 20, it is necessary to apply the photo-curable resin composition 22 to the entire surface of the protective panel 20 so as to make the bonding surface flat; however, precise control of this protruding portion 32 is difficult.

In particular, in a method of applying the photo-curable resin composition 22 to the protective panel 20 by discharging the photo-curable resin composition 22 from a discharge head having fine discharge holes, the photo-curable resin composition 22 is required to have a low viscosity. In general, the photo-curable resin composition 22 adjusted to a low viscosity often does not contain a plasticizer, which is a high molecular weight component, so that the storage elastic modulus after curing is also high, and the influence of the protruding portion 32 on the bonding accuracy tends to be greater.

Therefore, an object of the present technology is to provide a method for manufacturing an image display device capable of forming a photo-cured resin layer having a flat bonding surface bonded with an image display member, thereby preventing deterioration of image quality.

Solution to Problem

In order to solve the above-described problem, the present technology provides a method for manufacturing an image display device in which an image display member and a protective panel for protecting the image display surface of the image display member are laminated via a photo-cured resin layer, including:

Step A that is a step of applying a first photo-curable resin composition to the protective panel to form a first photo-curable resin composition layer having a protruding portion on the outer edge;

Step B that is a step of irradiating the first photo-curable resin composition layer with curing light to form a first cured resin layer;

Step C that is a step of applying a second photo-curable resin composition to the first cured resin layer to form a second photo-curable resin composition layer having reduced or eliminated height difference from the protruding portion;

Step D that is a step of laminating the protective panel and the image display member via the second photo-curable resin composition layer to form an image display module; and Step E that is a step of irradiating the second photo-curable resin composition layer side with curing light to form the photo-cured resin layer.

Advantageous Effects of Invention

The present technology can flatten the bonding surface of the photo-cured resin layer in order for the photo-cured resin layer to be uniformly bonded over the entire surface of the liquid crystal display without unevenness, thereby providing an image display device having a good image quality without color unevenness over the entire surface.

BRIEF DESCRIPTION OF DRAWINGS

FIG. 10A is a cross-sectional view illustrating a protective panel on which a photo-curable resin composition layer is formed, FIG. 10B is a cross-sectional view illustrating a step of irradiating the photo-curable resin composition layer with ultraviolet light, and FIG. 10C is a cross-sectional view illustrating a state in which the image display member and the protective panel are bonded together via a temporarily cured resin layer.

FIG. 11 is a cross-sectional view illustrating a configuration of a first photo-curable resin composition layer when the application amount of the first photo-curable resin composition is the same on the light shielding portion and on the main surface portion of the protective panel.

DESCRIPTION OF EMBODIMENTS

Figure 1:
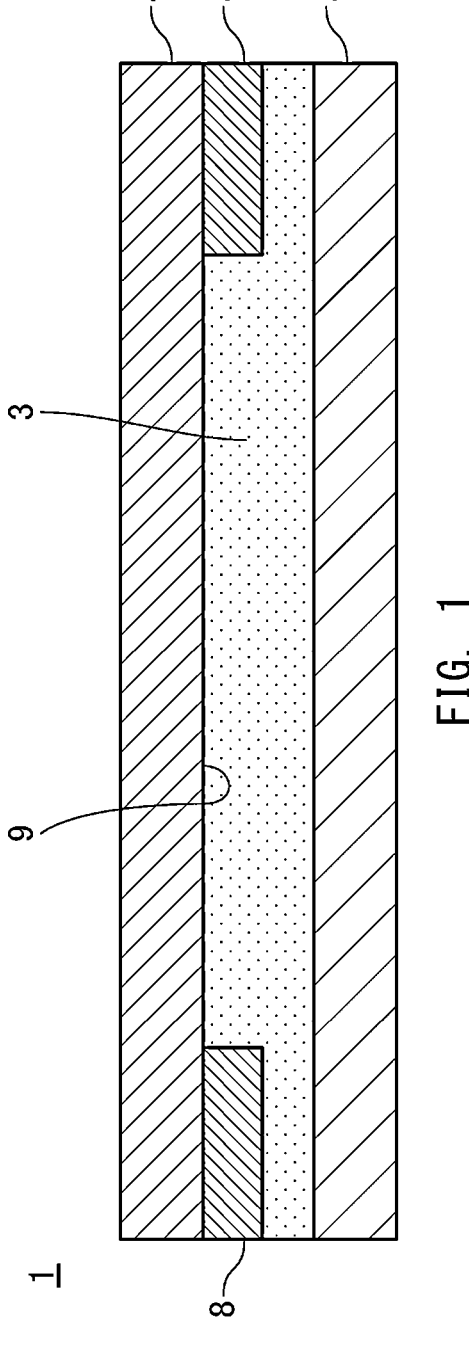
FIG. 1 is a cross-sectional view illustrating an example of an image display device manufactured by a manufacturing method according to the present technology.

Hereinafter, a method for manufacturing an image display device according to the present technology will be described in detail with reference to the drawings. It should be noted that the present disclosure is not limited to the following embodiments and various modifications can be made without departing from the scope of the present technology. Moreover, the features illustrated in the drawings are shown schematically and are not intended to be drawn to scale. Actual dimensions should be determined in consideration of the following description. Furthermore, those skilled in the art will appreciate that dimensional relations and proportions may be different among the drawings in certain parts.

Image Display Device

The present technology provides a method for manufacturing an image display device 1 shown in FIG. 1, which is formed by bonding an image display member 2 and a protective panel 4 via a photo-cured resin layer 3. The structure of the image display device 1 will be described prior to the description of the lamination process of the protective panel 4 and the image display member 2.

The image display device 1 is an optical device such as a liquid crystal display panel and an organic EL display panel, among others, and is used in various information terminals and information devices such as a smartphone, a car navigation device, and an instrument panel. As shown in FIG. 1, the image display device 1 is provided with the light-transmissive photo-cured resin layer 3 between the image display member 2 such as a liquid crystal display panel and the protective panel 4 for protecting the image display member 2 for the purpose of thinning and improving visibility.

Protective Panel

The protective panel 4 has a light transmitting property and is laminated with the image display member 2 via the photo-cured resin layer 3 to cover and protect the display surface of the image display member 2 while securing the visibility of the image display member 2.

The protective panel 4 may be made of glass or a resin material such as acrylic resin, polyethylene terephthalate, polyethylene naphthalate, or polycarbonate, as long as the protective panel 4 is optically transparent so that an image formed on the image display member 2 is visible. These materials can be subjected to a single-side or double-side hard coat treatment, antireflection treatment, or the like. When the image display member 2 described later is a touch panel, a part of the member of the touch panel can be used as the protective panel 4.

On the protective panel 4, in order to improve the brightness and contrast of the display image, a black frame-shaped light shielding portion 8 called a black matrix is formed in a region corresponding to the peripheral edge of the display region of the image display member 2. In the image display device 1, the inside of the light shielding portion 8 surrounding the display region of the image display member 2 functions as a display portion 9 for transmitting an image displayed on the display region of the image display member 2 through the protective panel 4.

The light shielding portion 8 is formed to have a uniform thickness by applying a coating material colored in black or the like by a screen printing method or the like, and then drying and curing the coating material. The thickness of the light shielding portion 8 is usually 5 to 100 μm.

The shape of the protective panel 4 according to the present technology is not particularly limited and is appropriately selected in accordance with the shape of the image display device 1. For example, the protective panel 4 may have a rectangular plate shape. Further, the protective panel 4 may have a curved surface shape, e.g., a shape that is concavely curved in one direction, a shape that is convexly curved in one direction, a rotated paraboloid, a hyperbolic paraboloid, or another quadric surface, or may have a flat portion in a part of a curved shape and a quadric surface shape.

It should be noted that dimensional features such as the shape and thickness and physical properties such as the elasticity of the protective panel 4 can be appropriately determined according to the intended use of the image display device 1.

Image Display Member

Examples of the image display member 2 may include image display members such as a liquid crystal display panel, an organic EL display panel, a plasma display panel, and a touch panel. Here, the touch panel means an image display/input panel which combines a display element such as a liquid crystal display panel and a position input device such as a touch pad. The surface shape of the image display member 2 on the side of the protective panel 4 is not particularly limited, but is preferably flat. Moreover, a polarizing plate may be arranged on the surface of the image display member 2.

Photo-Cured Resin Layer

The photo-cured resin layer 3 interposed between the protective panel 4 and the image display member 2 has a light transmitting property so that the image displayed by the image display member 2 is visible.

The photo-curable resin composition 10 constituting the photo-cured resin layer 3 is in a liquid state and may exhibit a viscosity of, e.g., 3 to 1,000 mPa*s or 3 to 500 mPa*s measured with a cone plate type viscometer at 25° C.

The photo-curable resin composition 10 may preferably include the following Components A, B, C and D, or include Components B, C, and D.

Component A

Component A is a film forming component of the light-transmissive photo-cured resin layer 3 and may be an acrylic oligomer and an acrylic polymer. Preferred examples of acrylic oligomers include (meth) acrylate oligomers having a backbone of polyisoprene, polyurethane or polybutadiene, among others. In the present specification, the term "(meth) acrylate" includes acrylate and methacrylate. Preferred examples of (meth) acrylate oligomers having a polyisoprene backbone include esterified product of maleic anhydride adduct of polyisoprene polymer and 2-hydroxyethyl methacrylate UC102 (KURARAY) (molecular weight in terms of polystyrene: 17,000), UC203 (KURARAY) (molecular weight in terms of polystyrene: 35,000), and UC-1 (KURARAY) (molecular weight in terms of polystyrene: 25,000). Examples of the (meth) acrylate oligomers having a polyurethane backbone include aliphatic urethane acrylate (EBECRYL 230 (Daicel-Cytec) (molecular weight of 5,000) and UA-1 (Light Chemical), among others. Examples of the acrylic polymer include a (meth) acrylate polymer having no (meth) acryloyl group. For example, a (meth) acrylate polymer having a hydroxyl value of 120 mgKOH/g or more, more preferably having a hydroxyl value of 170 mgKOH/g or more and having no (meth) acryloyl group may be used. By using such a base component, it is possible to impart plasticity to the cured product and to secure good film-forming properties (to maintain film properties) and adhesiveness.

The hydroxyl value of the (meth) acrylate polymer is the mass (mg) of KOH required to neutralize the acetic acid produced by acetylating the hydroxyl group in 1 g of the polymer and then hydrolyzing the acetyl group. Therefore, the larger the hydroxyl value, the more hydroxyl groups. The hydroxyl value of the (meth) acrylate polymer of Component A set to, e.g., 120 mgKOH/g or more can suppress reduction in the crosslinking density of the cured product of the photo-curable resin composition, and in particular, reduction in the elastic modulus at a high temperature. Further, from the viewpoint of preventing loss of flexibility due to excessive crosslinking density of the cured product of the photo-curable resin composition, the hydroxyl value of the (meth) acrylate polymer is preferably 400 mg KOH/g or less and more preferably 350 mg KOH/g or less. Further, by using a (meth) acrylate polymer having no (meth) acryloyl group as the (meth) acrylate polymer of Component A, it is possible to prevent excessive incorporation into the main chain of the polymer chain composed of the (meth) acrylate monomer of Component B and Component C.

When the (meth) acrylate polymer is contained as Component A, the weight-average molecular weight Mw of the (meth) acrylate polymer is preferably 5,000 or more, and more preferably 100,000 or more, because if the molecular weight is too small, the number of molecules into which a hydroxyl group is not introduced increases, which tends to increase the risk of bleed. Further, the weight-average molecular weight Mw of the (meth) acrylate polymer of Component A is preferably 500,000 or less, more preferably 300,000 or less, because excessively large size tends to cause ejection failure due to viscosity increase. In the present specification, the weight-average molecular weight Mw and number-average molecular weight Mn of the polymer can be measured by gel permeation chromatography (GPC) (in terms of standard polystyrene molecular weight).

The degree of dispersion (Mw/Mn) of the (meth) acrylate polymer of Component A is preferably 3 or more because insufficient degree of dispersion tends to easily separate the polymer and unreacted monomers, and is preferably 10 or less because excessive degree of dispersion will introduce an undesirable polymer component of a relatively low molecular weight.

Preferable examples of the (meth) acrylate polymer of Component A may include a copolymer of a hydroxyl group-containing (meth) acrylate monomer and a hydroxyl group-free (meth) acrylate monomer. This is preferably in a liquid state at normal temperature. Although the examples can include a homopolymer of a hydroxyl group-containing (meth) acrylate monomer, there is a concern that the polarity of the polymer becomes too high, so that the polymer tends to become a highly viscous liquid or solid at ordinary temperature, and compatibility with other components is lowered.

The hydroxyl group-containing (meth) acrylate monomer, which is a monomer unit constituting the (meth) acrylate polymer of Component A, is a (meth) acrylate having one or more hydroxyl groups in the molecule, and specific examples may include 2-hydroxypropyl (meth) acrylate, 3-hydroxypropyl (meth) acrylate, 4-hydroxybutyl (meth) acrylate, 2-hydroxy-3-chloropropyl (meth) acrylate, 2-hydroxy-3-phenoxypropyl (meth) acrylate, ethylene glycol (meth) acrylate, polyethylene glycol (meth) acrylate, propylene glycol (meth) acrylate, polypropylene glycol (meth) acrylate, and cyclohexyl dimethanol mono (meth) acrylate. Among these, 2-hydroxyethyl (meth) acrylate is preferable in terms of polarity control and price.

The hydroxyl group-free (meth) acrylate monomer which can constitute the (meth) acrylate polymer of Component A is preferably a monofunctional (meth) acrylate alkyl ester having a straight chain or a branched alkyl group having a carbon number of 1 to 18, and specific examples may include methyl (meth) acrylate, ethyl (meth) acrylate, propyl (meth) acrylate, isopropyl (meth) acrylate, n-butyl (meth)

acrylate, isobutyl (meth) acrylate, pentyl (meth) acrylate, hexyl (meth) acrylate, 2-ethylhexyl (meth) acrylate, octyl (meth) acrylate, isooctyl (meth) acrylate, nonyl (meth) acrylate, isononyl (meth) acrylate, decyl (meth) acrylate, isodecyl (meth) acrylate, lauryl (meth) acrylate, stearyl (meth) acrylate, isostearyl (meth) acrylate, and tridecyl (meth) acrylate.

A particularly preferable example of the (meth) acrylate polymer of Component A is a copolymer of 2-hydroxyethyl acrylate and 2-ethylhexyl acrylate from the viewpoint of availability and feasibility of the effect of the invention, among other factors. Isobornyl acrylate may be further copolymerized.

The content of Component A in the photo-curable resin composition can be changed according to the amounts of the other Components B, C, and D. For example, the photo-curable resin composition may not contain Component A. When the photo-curable resin composition contains Component A, the content of Component A in the photo-curable resin composition may be, e.g., 1 mass % or more, or 10 mass % or more. The content of Component A in the photo-curable resin composition may be 55 mass % or less, or 45 mass % or less.

Component B

The photo-curable resin composition preferably contains a hydroxyl group-containing monofunctional (meth) acrylate monomer (Component B) as a polymerization component. By containing a hydroxy group when a (meth) acrylate polymer containing a hydroxy group is contained as Component A, the hydroxyl group-containing monofunctional (meth) acrylate monomer has a high affinity with the hydroxyl group-containing (meth) acrylate polymer, thereby further improving the reliability in a high-temperature and high-humidity environment. In this case, a plurality of hydroxyl groups may be present in the monomer molecule, but the number of the hydroxyl groups present in the monomer molecule is preferably one.

A specific example of the hydroxyl group-containing monofunctional (meth) acrylate monomer of Component B may be a monomer similar to the hydroxyl group-containing (meth) acrylate monomer which can constitute the (meth) acrylate polymer of Component A. Among them, at least one selected from 4-hydroxybutyl (meth) acrylate and 2-hydroxyethyl (meth) acrylate is preferable.

The content of the hydroxyl group-containing monofunctional (meth) acrylate monomer of Component B in the photo-curable resin composition is preferably 1 mass % or more, more preferably 5 mass % or more, because insufficient content tends to make the resin to be unreliable in a high-temperature and high-humidity environment, and is preferably 30 mass % or less, more preferably 25 mass % or less, because excessive content tends to make the resin to lose the polarity balance before or after curing to become opaque.

Component C

The photo-curable resin composition preferably contains a hydroxyl group-free monofunctional (meth) acrylate monomer (Component C) as a polymerization component. The purpose of using a material that does not contain a hydroxyl group is to set the adhesiveness and viscosity of the cured product of the photo-curable resin composition composed of Component A and Component B within appropriate ranges respectively and to improve the performance as a transparent adhesive.

A specific example of the hydroxyl group-free monofunctional (meth) acrylate monomer of Component C may be a monomer similar to the hydroxyl group-free (meth) acrylate monomer which can constitute the (meth) acrylate polymer of Component A. Among them, at least one selected from isostearyl (meth) acrylate and octyl (meth) acrylate is preferable.

The content of the hydroxyl group-free monofunctional (meth) acrylate monomer of Component C in the photo-curable resin composition is preferably 30 mass % or more, more preferably 65 mass % or more, because insufficient content tends to make the resin to have a high viscosity, and is preferably 90 mass % or less, more preferably 75 mass % or less, because excessive content tends to make the resin to be fragile.

Component D

In the photo-curable resin composition, a known photo-radical polymerization initiator can be used as the photo-polymerization initiator (Component D). Preferably, Component D is not an intramolecular cleavage type photopolymerization initiator such as a benzoin derivative but a hydrogen abstraction type photopolymerization initiator. When Component A contains a hydroxyl group-containing (meth) acrylate polymer, this makes it possible for the hydroxyl group-containing (meth) acrylate polymer to be bonded to the side chain of the polymer chain.

As the hydrogen abstraction type photopolymerization initiator of Component D, a known hydrogen abstraction type photopolymerization initiator can be used, and the examples may include diaryl ketones such as benzophenone and phenylglyoxylates such as methylbenzoylformate. A preferred example is methyl benzoyl formate due to its non-yellowing and high hydrogen abstraction ability.

The content of the hydrogen abstraction type photopolymerization initiator of Component D in the photo-curable resin composition is preferably 0.1 mass % or more, more preferably 1 mass % or more, because insufficient content tends to cause insufficient crosslinking, and is preferably 10 mass % or less, more preferably 5 mass % or less, because excessive content tends to cause deterioration of environmental reliability.

Component E

The photo-curable resin composition may further contain a polyfunctional (meth) acrylate monomer (Component E) in order to improve the reaction rate and maintain the high temperature elastic modulus. Specific examples of polyfunctional (meth) acrylate monomers may include bifunctional or multifunctional (meth) acrylates such as 1,6-hexanediol diacrylate (HDDA), 1,9-nonanediol diacrylate, 1,10-decanediol diacrylate, and pentaerythritol triacrylate. They can have other functional groups, such as hydroxyl groups, as long as they do not impair the effectiveness of the present technology. Preferable specific examples of the polyfunctional (meth) acrylate monomer include at least one selected from trimethylolpropane triacrylate, pentaerythritol triacrylate, and neopentyl glycol hydroxypivalate diacrylate.

The content of the polyfunctional (meth) acrylate monomer of Component E in the photo-curable resin composition is preferably 0.1% or more, more preferably 1 mass % or more, because insufficient content tends to cause a low crosslinking density, and is preferably 5 mass % or less, more preferably 3 mass % or less, because excessive content tends to make the resin to be fragile.

Other Components

In the photo-curable resin composition, in addition to Components A to D described above, various additives can be blended within a range that does not impair the effectiveness of the present invention. For example, as a liquid plasticizer for reducing the curing shrinkage rate, a polybutadiene-based plasticizer, a polyisoprene-based plasticizer, a phthalic ester-based plasticizer, or an adipic ester-based plasticizer may be blended. In addition, as a tackifier for improving tackiness, a terpene-based resin, a rosin resin, or a petroleum resin may be blended. Furthermore, as a chain transfer agent to adjust the molecular weight of the cured product, 2-mercaptoethanol, lauryl mercaptan, glycidyl mercaptan, mercaptoacetic acid, 2-ethylhexyl thioglycolate, 2,3-dimethylcapto-1-propanol, or α-methylstyrene dimer may be blended. In addition, general additives such as an adhesion improving agent such as a silane coupling agent and an antioxidant may be blended as required.

First Manufacturing Process

Next, a first manufacturing process of the image display device 1 will be described. The manufacturing process of the image display device 1 includes the following steps A to E in a method for manufacturing an image display device in which an image display member and a protective panel for protecting the image display surface of the image display member are laminated via a photo-cured resin layer.

Step A

This is a step of applying a first photo-curable resin composition to the protective panel to form a first photo-curable resin composition layer having a protruding portion on the outer edge.

Step B

This is a step of irradiating the first photo-curable resin composition layer with curing light to form a first cured resin layer.

Step C

This is a step of applying a second photo-curable resin composition to the first cured resin layer to form a second photo-curable resin composition layer having reduced or eliminated height difference from the protruding portion.

Step D

This is a step of laminating the protective panel and the image display member via the second photo-curable resin composition layer to form an image display module.

Step E

This is a step of irradiating the second photo-curable resin composition layer side with curing light to form the photo-cured resin layer.

The present technology can form the second photo-curable resin composition layer in which the difference in height from the protruding portion formed on the first cured resin layer is reduced or eliminated by further applying the second photo-curable resin composition after the first cured resin layer is formed on the protective panel. This makes it possible to form a photo-cured resin layer having a flat bonding surface to be bonded with the image display member, thereby preventing deterioration of image quality of the image display device.

Step A

Figure 2:
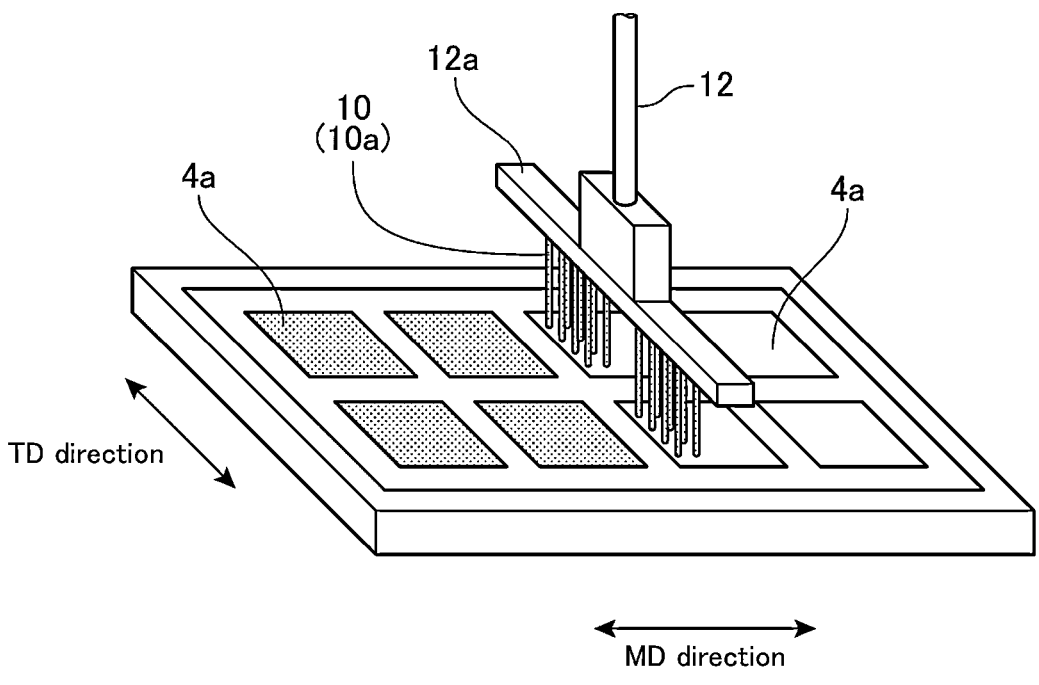
FIG. 2 is a perspective view illustrating a step of applying a photo-curable resin composition to a protective panel.

First, a protective panel 4 is prepared, and as shown in FIG. 2, a first photo-curable resin composition layer 11 is formed by applying a photo-curable resin composition 10 to a bonding surface 4a to be bonded with the image display member 2 by a discharge device 12. The photo-curable resin composition 10 applied in Step A is defined as the first photo-curable resin composition 10a.

Any known discharge device may be used as the discharge device 12 for applying the first photo-curable resin composition 10a to the protective panel 4, but a suitable device is an ink-jet type discharge device having one or more discharge heads in which a plurality of discharge holes are arranged in a predetermined pattern to discharge fine droplets from the discharge holes to apply them to the protective panel 4. Such a discharge device can apply a predetermined amount of the first photo-curable resin composition 10a with a desired thickness and a desired pattern at a fast application speed (e.g., thickness of 30 μm, application speed of 170 mm/sec).

The discharge device 12 shown in FIG. 2 has a discharge head 12a provided with a plurality of discharge holes, and the discharge head 12a is disposed facing the bonding surface 4a of the protective panel 4 to discharge the first photo-curable resin composition while moving relative to the protective panel 4. Further, the discharge device 12 may adjust the discharge width and the discharge force by providing a plurality of discharge heads 12a. The plurality of discharge heads 12a may be arranged in parallel or in a staggered pattern.

As shown in FIG. 2, a plurality of protective panels 4 may be arranged, and the first photo-curable resin composition layer 11 may be formed on the plurality of protective panels 4 simultaneously in one application step.

Figure 3:
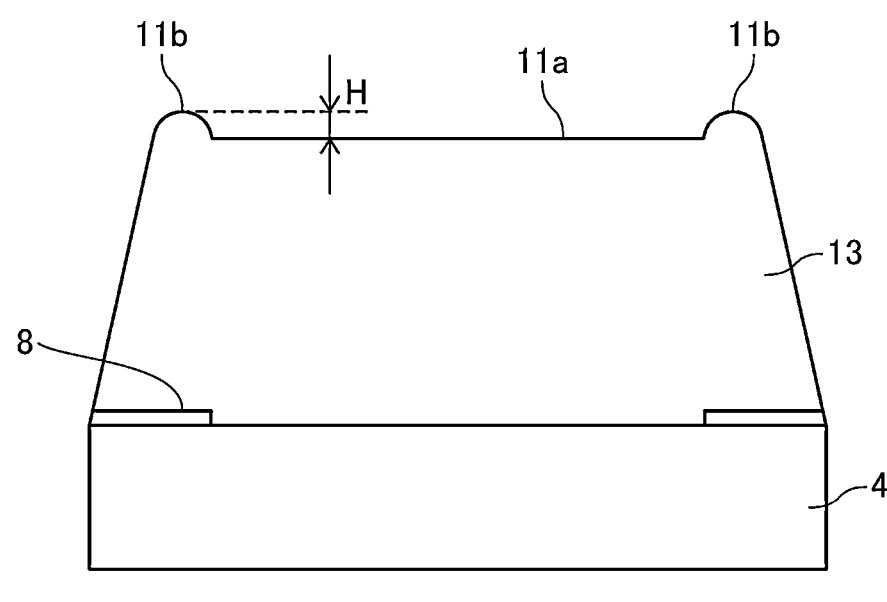
FIG. 3 is a cross-sectional view illustrating a protective panel on which a first photo-curable resin composition layer is formed.

Here, the first photo-curable resin composition 10a has a low viscosity (e.g., 3 to 1,000 mPa*s) that can be discharged by the ink-jet type discharge device 12. Therefore, as shown in FIG. 3, the first photo-curable resin composition layer 11 has a protruding portion 11b that rises above the main surface portion 11a along the outer edge by the action of surface tension. The main surface portion 11a is a recessed portion surrounded by the protruding portion 11b.

Further, since the first photo-curable resin composition 10a often does not contain a plasticizer which is a high molecular weight component, the storage modulus after curing tends to be high. Specifically, it is in the range of 1,000 to 10,000,000 Pa. Therefore, even if the height H of the protruding portion 11b is several tens of μm, the protruding portion 11b may affect the bonding accuracy of the protective panel 4 and the image display member 2, and may impair the visibility of the image display device 1. Therefore, the present technology includes a step of applying the second photo-curable resin composition 10b as Step C described later to improve the flatness of the surface of the photo-cured resin layer 3. The height H of the protruding portion 11b is a distance between the main surface portion 11a of the first photo-curable resin composition layer 11 and the highest portion of the protruding portion 11b in a direction orthogonal to the surface of the protective panel 4 (FIG. 3).

The application area of the first photo-curable resin composition 10a to the protective panel 4 can be set appropriately according to the configuration of the image display device and may be the entire surface of the protective panel 4, or a non-application area may be partly provided. When the first photo-curable resin composition 10a is applied to the entire surface of the protective panel 4, the protruding portion 11b is formed along the outer edge of the protective panel 4.

Step B

Figure 4:
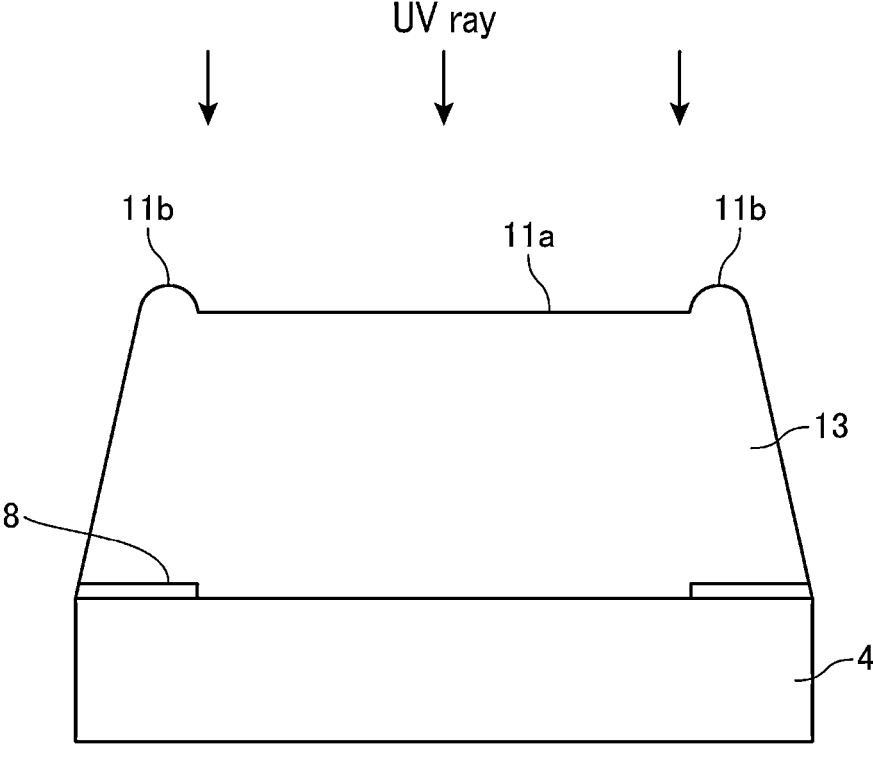
FIG. 4 is a cross-sectional view illustrating a step of forming a first cured resin layer.

Next, as shown in FIG. 4, the first photo-curable resin composition layer 11 is irradiated with curing light such as ultraviolet light to form a first cured resin layer 13. The irradiation condition for the first photo-curable resin composition layer 11 is such that the curing rate is at least sufficient to maintain the application shape of the first photo-curable resin composition layer 11 (e.g., 40 to 50% or more). In other words, the first cured resin layer 13 is cured with the protruding portion 11b formed therein.

A known light source such as an LED, a mercury lamp, a metal halide lamp, and a xenon lamp can be used as the light source of the curing light.

Here, the curing rate is a numerical value defined as a ratio (consumption rate) of the amount of (meth) acryloyl group present in the photo-curable resin composition after light irradiation to the amount of (meth) acryloyl group present in the photo-curable resin composition before light irradiation. The larger the numerical value of the curing rate is, the more the curing of the photo-curable resin composition progresses. Specifically, the curing rate can be calculated by substituting an absorption peak height (X) of 1,640 to 1,620 cm$^{-1}$ from the baseline in the FT-IR measurement chart of the photo-curable resin composition 6 before light irradiation and the absorption peak height (Y) of 1,640 to 1,620 cm$^{-1}$ from the baseline in the FT-IR measurement chart of the photo-curable resin composition (first cured resin layer 13) after light irradiation into the following equation.

$$\text{Curing rate } (\%)=[(X-Y)/X]\times 100$$

The conditions of the light irradiation such as light source type, output power, illuminance, integrated light quantity, and the like are not particularly limited as long as the curing rate of the first cured resin layer 13 is preferably 40 to 50% or more.

Further, the curing in Step B for curing the first photo-curable resin composition layer 11 may be a so-called temporary curing in which the curing rate is limited to such a degree that the application shape of the first photo-curable resin composition layer 11 can be maintained, or may be a so-called final curing in which the first photo-curable resin composition layer is completely cured (e.g., a curing rate of 90% or more, preferably 95% or more).

In the above-described Step A, if the desired thickness cannot be obtained by one application by the discharge device 12, the first photo-curable resin composition may be applied a plurality of times. In this case, after the first photo-curable resin composition is applied a plurality of times, the first photo-curable resin composition layer 11 may be irradiated with curing light such as ultraviolet light to form the first cured resin layer 13. Alternatively, the step of applying the first photo-curable resin composition and then irradiating the first photo-curable resin composition with curing light such as ultraviolet light may be repeated a plurality of times.

Step C

Figure 5:
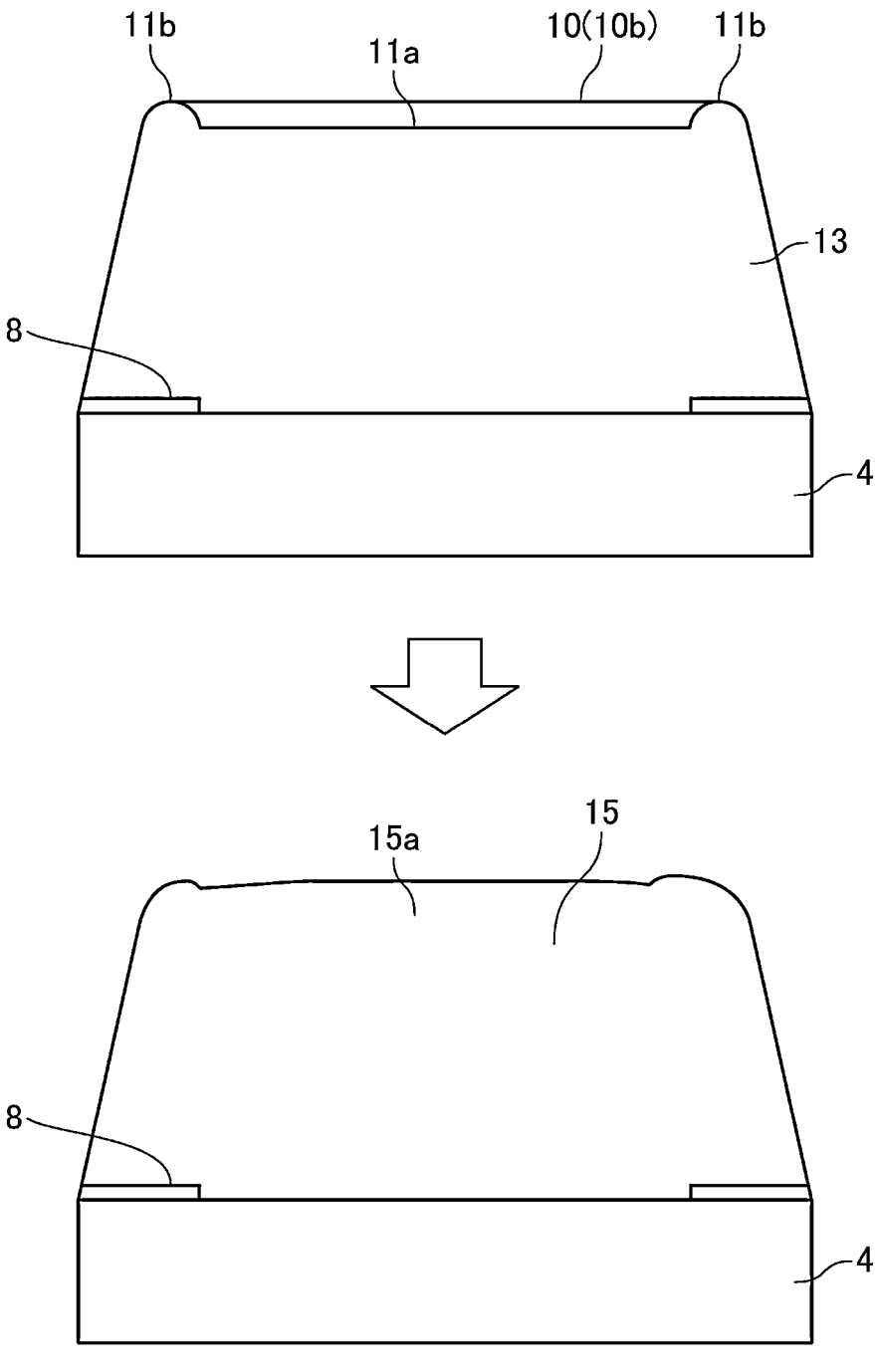
FIG. 5 is a cross-sectional view illustrating a step of forming a second photo-curable resin composition layer.

Next, as shown in FIG. 5, a photo-curable resin composition 10 is applied to the first cured resin layer 13 to form a second photo-curable resin composition layer 15. The photo-curable resin composition 10 applied in Step C is defined as the second photo-curable resin composition 10b. The second photo-curable resin composition layer 15 refers to the layer composed of the first cured resin layer 13 and the second photo-curable resin composition 10b.

The second photo-curable resin composition 10b may be the same photo-curable resin composition as the first photo-curable resin composition 10, but is not limited thereto. For example, the second photo-curable resin composition 10b may be a photo-curable resin composition 10 having a composition different from that of the first photo-curable resin composition 10a as long as the refractive index is substantially the same.

The second photo-curable resin composition 10b may be a photo-curable resin composition 10 having a viscosity higher than that of the first photo-curable resin composition 10a. This makes it difficult for the second photo-curable resin composition 10b applied to the slope of the protruding portion 11b of the first cured resin layer 13 to flow, so that the second photo-curable resin composition layer 15 can be flatter up to the end.

The second photo-curable resin composition 10b is applied to at least the main surface portion 11a of the first cured resin layer 13. As a result, the height difference between the protruding portion 11b formed on the first cured resin layer 13 and the main surface portion 15a of the second photo-curable resin composition layer 15 is reduced or eliminated, so that the surface of the second photo-curable resin composition layer 15 is substantially flat. By such flattening, it is possible to form the photo-cured resin layer 3 having a substantially flat bonding surface to be bonded with the image display member.

The application of the second photo-curable resin composition 10b can be carried out by suitably using a discharge device to which the above-described ink-jet method is applied (see FIG. 2). With such a discharge device, a predetermined amount of the photo-curable resin composition 10b can be applied with a desired thickness and a desired pattern.

In this Step C, the second photo-curable resin composition 10b may be applied a plurality of times to form a multilayered second photo-curable resin composition layer 15.

Figure 6:
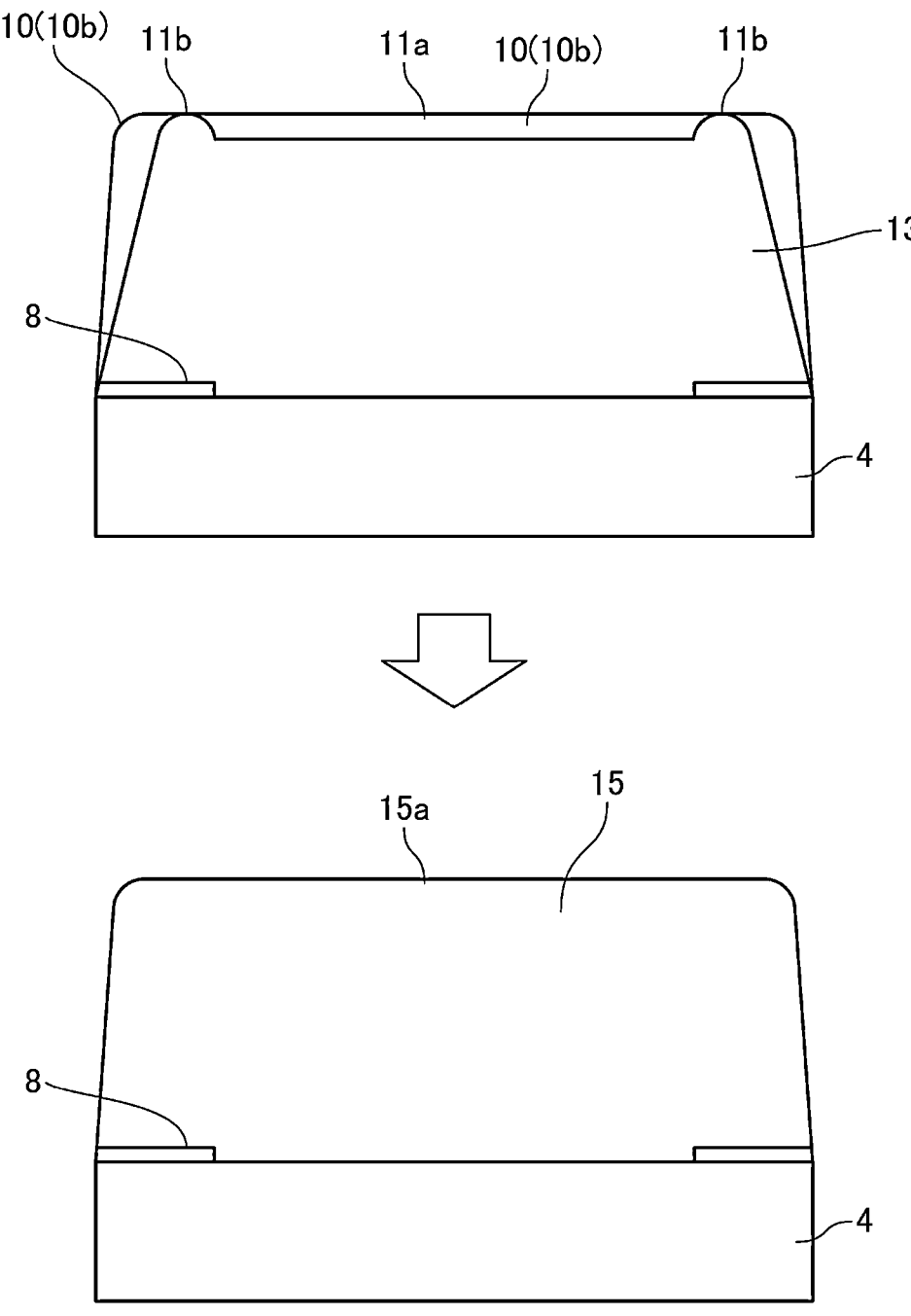
FIG. 6 is a cross-sectional view illustrating a step of forming a second photo-curable resin composition layer by applying the second photo-curable resin composition to the outer slope of the protruding portion of the first photo-curable resin layer.

As shown in FIG. 6, the second photo-curable resin composition 10b may be applied up to the outer slope of the protruding portion 11b of the first photo-curable resin layer 13. Thus, the entire surface of the first photo-curable resin layer 13 including the outer slope of the protruding portion 11b is covered with the second photo-curable resin composition 10b, and the flattened photo-cured resin layer 3 can be formed over the entire surface of the application region of the photo-curable resin composition 10. Here, a control is required to make the application amount on the protruding portion 11b to be smaller than the application amount on the main surface portion 11a and the application amount on the outside of the protruding portion 11b to be larger; the above-described ink-jet type discharge device 12 can easily control the application amounts for respective coating positions.

The application patterns of the second photo-curable resin composition 10b may include Pattern 1 of application only to the central portion of the main surface portion 11a of the first cured resin layer 13, Pattern 2 of application to the central portion and the end portion of the main surface portion 11a of the first cured resin layer 13 respectively, and Pattern 3 of application to the entire surface including the main surface portion 11a and the protruding portion 11b of the first cured resin layer 13.

In Pattern 1 and Pattern 2, the application thickness of the second photo-curable resin composition 10b is in the range of 30% to 120% of the height H of the protruding portion 11b, preferably, the upper limit is 100% and the lower limit is 90%. In Pattern 2, the second photo-curable resin composition 10b is not applied on the protruding portion 11b. In Pattern 3, the discharge amount is changed between the main surface portion 11a and the protruding portion 11b, such that the discharge amount is relatively decreased on the protruding portion 11b. In Pattern 3, the application thickness of the second photo-curable resin composition 10b on the main surface portion 11a is in the range of 100% to 300% of the height H of the protruding portion 11b, but preferably the upper limit is about 150%.

Patterns 1 to 3 and the application thickness of the second photo-curable resin composition 10b in each pattern need to be appropriately selected for the purpose of reducing or eliminating the difference in height between the protruding portion 11b and the main surface portion 15a of the second photo-curable resin composition layer 15 in consideration of the viscosity of the second photo-curable resin composition 10*b*, the discharge speed and the moving speed of the discharge head 12*a*, and other factors.

In Step C, immediately after the second photo-curable resin composition 10*b* is applied, the second photo-curable resin composition layer 15 is irradiated with curing light such as ultraviolet light and temporarily cured. The irradiation condition for the second photo-curable resin composition layer 15 is such that the curing rate is at least sufficient to maintain the shape of the second photo-curable resin composition layer 15 (e.g., 40 to 50% or more).

Step D

Figure 7:
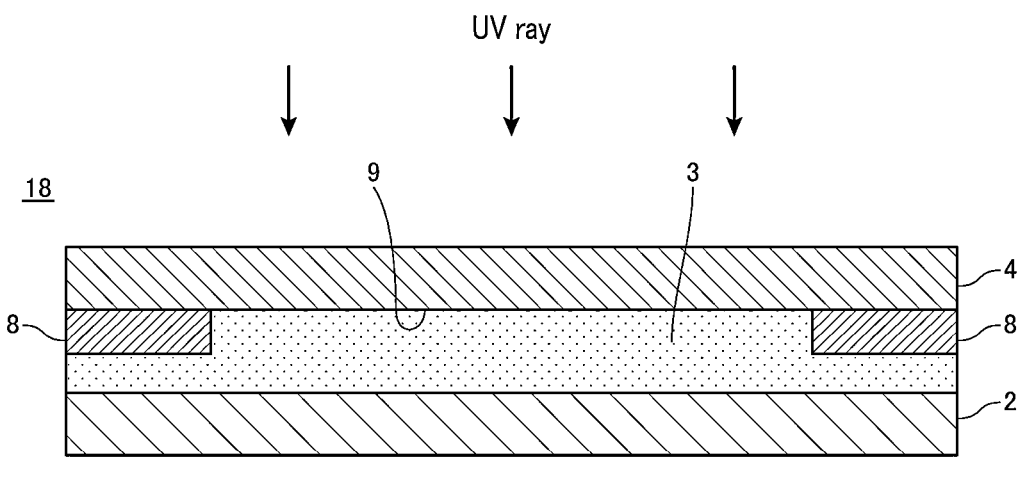
FIG. 7 is a cross-sectional view illustrating a step of laminating a protective panel and an image display member via a second photo-curable resin composition layer to form an image display module.

Next, as shown in FIG. 7, the protective panel 4 and the image display member 2 are laminated via the second photo-curable resin composition layer 15 to form an image display module 18. The lamination can be performed by applying pressure under a predetermined temperature environment (e.g., 10 to 80° C.) by using a known press-bonding device. In order to prevent air bubbles from entering between the second photo-curable resin composition layer 15 and the image display member 2, it is preferable to perform lamination by a so-called vacuum lamination method.

It should be noted that, after Step D, a known pressure defoaming process (example processing conditions: 0.2 to 0.8 MPa, 25 to 60° C., 5 to 20 min) may be performed on the image display module 18.

Step E

After Step D, the side of the second photo-curable resin composition layer 15 of the protective panel 4 of the image display module 18 is irradiated with the curing light to final-cure and form the photo-cured resin layer 3. When the first cured resin layer 13 formed in Step B is a temporary cured layer, the first cured resin layer 13 is also final-cured in Step E. Thus, the image display device 1 is implemented in which the protective panel 4 and the image display member 2 are adhered and laminated via the photo-cured resin layer 3 having a flattened bonding surface. In such an image display device 1, since the bonding surface of the photo-cured resin layer 3 to be bonded to the image display member 2 is flattened, the photo-cured resin layer 3 is uniformly bonded over the entire surface without unevenness, and has excellent image quality over the entire surface.

Step E may be performed after Step C and before Step D. In other words, before lamination with the image display member 2, the photo-cured resin layer 3 may be formed of the second photo-curable resin composition layer 15 that has been final-cured in advance. Since the photo-cured resin layer 3 has a flattened bonding surface to be bonded with the image display member 2, the photo-cured resin layer 3 can be uniformly bonded over the entire surface without any unevenness so that no bubbles are entrained into the interface between the photo-cured resin layer 3 and the image display member 2.

First Examples

Next, examples of forming an image display device using the present technology will be described. In the present examples, a cover glass was prepared as the protective panel 4 and a liquid crystal display (LCD) was prepared as the image display member 2, thereby forming an image display device in which the liquid crystal display and the cover glass are laminated via an ultraviolet-curable photo-cured resin layer. On the cover glass, a black frame-shaped light shielding portion is formed at a position corresponding to the periphery of the display area of the LCD.

Then, color unevenness in the screen displaying white of the image display devices of Example 1, Comparative Example 1, and Comparative Example 2 described below was evaluated visually.

Example 1

In Example 1, a cover glass was first placed on a stage of an application device, and a photo-curable resin composition (storage modulus after curing was $4.4 \times 10^5$ Pa) was applied as a first photo-curable resin composition to form a first photo-curable resin composition layer. The application thickness was 450 μm. The application thickness refers to a thickness from the cover glass surface to the main surface of the first photo-curable resin composition layer. A protruding portion was formed along the outer edge of the first photo-curable resin composition layer.

In Example 1, an ink-jet application device was used. In the application device used in Example 1, three discharge heads are arranged in tandem, and the dot density in the TD direction of each discharge head for discharging the photo-curable resin composition was 360 dpi. The dot density in the MD direction of each discharge head was 2,880 dpi. The stage on which the cover glass was disposed had a width of 260 mm and a length of 310 mm, and the application range had a width of 60 mm and a length of 60 mm.

Next, the first photo-curable resin composition layer was irradiated with ultraviolet light and temporarily cured to form a first cured resin layer. A metal halide lamp was used as a UV light source. Next, the same photo-curable resin composition as the first photo-curable resin composition was applied to the first cured resin layer as the second photo-curable resin composition, and the second photo-curable resin composition was irradiated with ultraviolet light and temporarily cured to form the second photo-curable resin composition layer. As the application pattern, the above-mentioned Pattern 3 was employed, so that the second photo-curable resin composition was applied to the entire surface of the first cured resin layer including the main surface portion and the protruding portion. In the second photo-curable resin composition layer, the height difference between the protruding portion formed in the first cured resin layer and the main surface portion of the second photo-curable resin composition layer was reduced or eliminated, so that the surface was flattened.

Next, the cover glass and the liquid crystal display were laminated via the second photo-curable resin composition layer to form an image display module. Then, the second photo-curable resin composition layer was irradiated with curing light from the cover glass side of the image display module to be final-cured, thereby forming a photo-cured resin layer. Thus, an image display device in which the cover glass and the liquid crystal display are adhered and laminated via the photo-cured resin layer having a flattened bonding surface was obtained.

Comparative Example 1

In Comparative Example 1, a cover glass was first placed on a stage of an application device, and a photo-curable resin composition was applied to form a photo-curable resin composition layer. The same application device as in Example 1 was used. A protruding portion having a height of 60 μm was formed along the outer edge of the photo-curable resin composition layer. Then, the photo-curable resin composition layer was irradiated with ultraviolet light and temporarily cured to form a temporarily cured resin layer. A metal halide lamp was used as a UV light source.

Next, the cover glass and the liquid crystal display were laminated via the temporarily cured resin layer to form an image display module. Then, the temporarily cured resin layer was irradiated with curing light from the cover glass side of the image display module to be final-cured, thereby forming a photo-cured resin layer. Thus, an image display device in which a cover glass and a liquid crystal display are adhered and laminated via a photo-cured resin layer was obtained.

Comparative Example 2

In Comparative Example 2, a cover glass was first placed on a stage of an application device, and a photo-curable resin composition was applied to form a photo-curable resin composition layer. The same application device as in Example 1 was used. A protruding portion having a height of 30 μm was formed along the outer edge of the photo-curable resin composition layer. Then, the photo-curable resin composition layer was irradiated with ultraviolet light and temporarily cured to form a temporarily cured resin layer. A metal halide lamp was used as a UV light source.

Next, the cover glass and the liquid crystal display were laminated via the temporarily cured resin layer to form an image display module. Then, the temporarily cured resin layer was irradiated with curing light from the cover glass side of the image display module to be final-cured, thereby forming a photo-cured resin layer. Thus, an image display device in which a cover glass and a liquid crystal display were adhered and laminated via a photo-cured resin layer was obtained.

Reference Example

Figure 8:
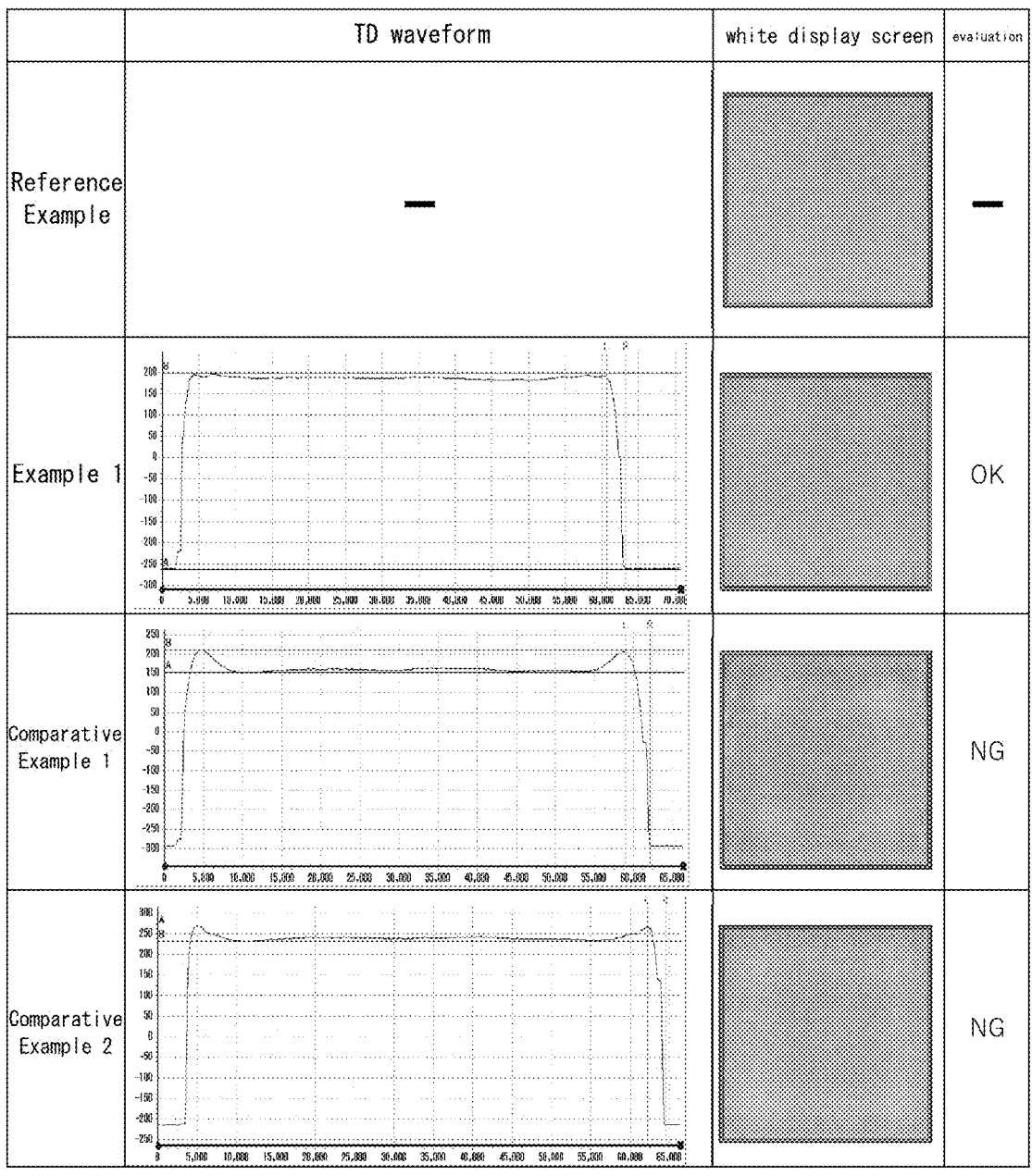
FIG. 8 is a diagram showing the height (TD waveform) of the photo-cured resin layer, the white display and the color unevenness evaluation result of the liquid crystal display with regard to image display devices according to Reference Example, Example 1, Comparative Example 1, and Comparative Example 2.
Figure 9:
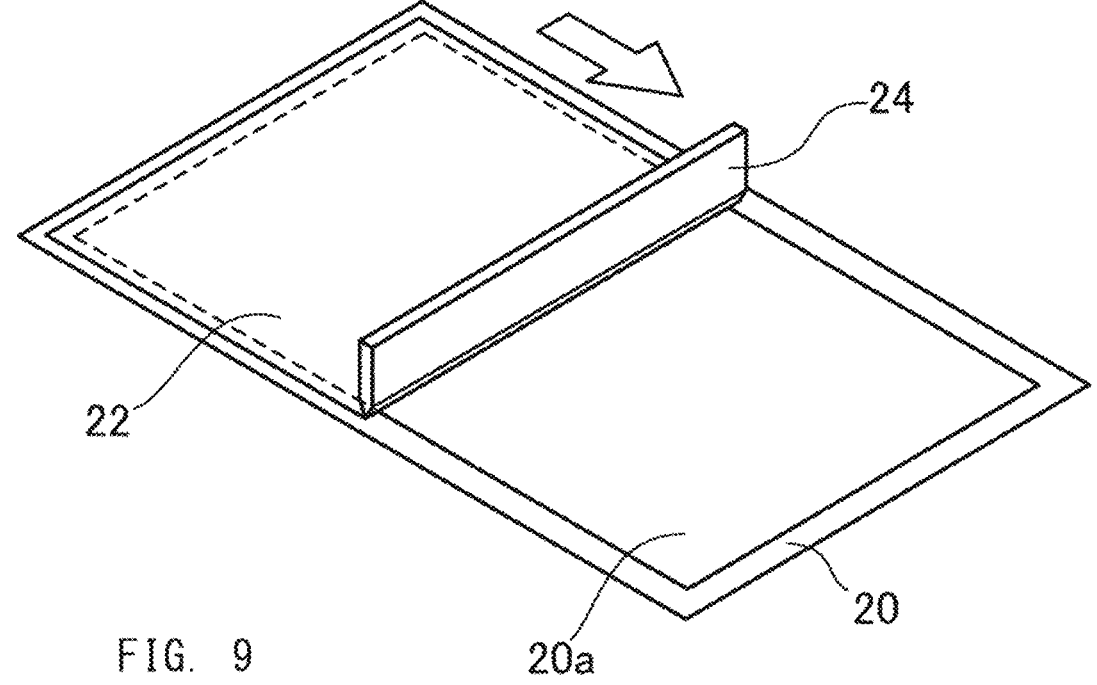
FIG. 9 is a perspective view illustrating a step of applying a photo-curable resin composition to a surface of a protective panel by an application head.

As a reference example, an image display device consisting only of a liquid crystal display in which no cover glass was laminated was prepared. FIG. 8 shows the height of the photo-cured resin layer (TD waveform), the white display screen of the liquid crystal display displaying white image, and the color unevenness evaluation result with regard to the image display devices according to Example 1, Comparative Example 1, and Comparative Example 2.

As shown in FIG. 8, the image display device according to Example 1 has an excellent image quality without color unevenness over the entire surface since the bonding surface of the photo-cured resin layer bonded with the liquid crystal display is flattened so that the photo-curable resin layer is uniformly bonded over the entire surface without unevenness.

On the contrary, in the image display devices according to Comparative Examples 1 and 2, the cover glass and the liquid crystal display were not uniformly bonded to each other due to the influence of protruding portion formed on the photo-cured resin layer, resulting in occurrence of color unevenness. In Comparative Example 2, even if the height of the protruding portion was 30 μm, since the photo-curable resin composition having a low viscosity was used in order to use an ink-jet type application device, color unevenness occurred under the influence of a high elastic modulus after curing.

Second Manufacturing Process

Next, a second manufacturing process of the image display device 1 will be described. In the protective panel 4 according to the second manufacturing process, the protective panel 4 is provided with a light shielding portion 8 to form a stepped portion 8a between the light shielding portion 8 and the main surface portion 4b, and in Step A, the application thickness of the first photo-curable resin composition on the main surface portion 4b of the protective panel 4 is thicker than the application thickness of the first photo-curable resin composition on the light shielding portion 8 of the protective panel 4, and the application thickness of the first photo-curable resin composition on the light shielding portion 8 of the protective panel 4 is set to be within ±30% of the height of the stepped portion 8a.

In other words, as shown in FIG. 11, providing the light shielding portion 8 in the protective panel 4 forms the stepped portion 8a having a height H1 between the main surface portion 4b of the protective panel 4 and the light shielding portion 8. Here, if the application amount of the first photo-curable resin composition 10a applied on the main surface portion 4b and that on the light shielding portion 8 are the same, in addition to the protruding portion 11b, a stepwise protrusion appears above the stepped portion 8a in the first photo-curable resin composition layer 11, which might hinder the flattening of the second photo-curable resin composition layer 15 in Step C in which the second photo-curable resin composition 10b is applied to form the second photo-curable resin composition layer 15.

Figure 12:
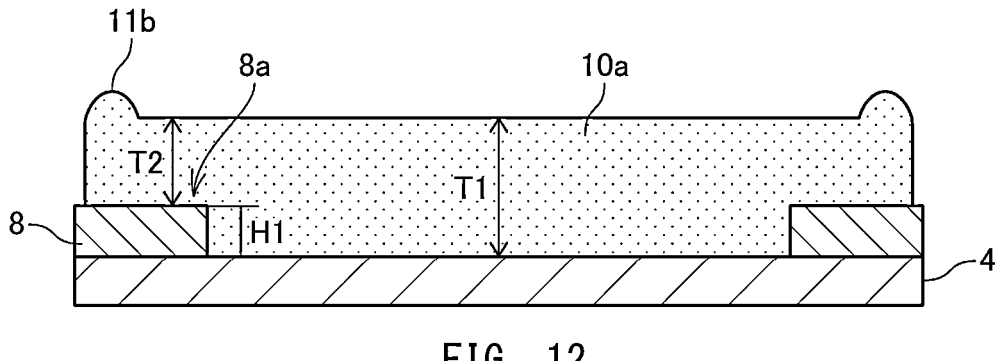
FIG. 12 is a cross-sectional view illustrating a configuration in which the application thickness T2 of the first photo-curable resin composition on the light shielding portion is set within the range of the height H1±30% of the stepped portion in Step A of the second manufacturing process.

Therefore, as shown in FIG. 12, in this second manufacturing process, Step A in which the first photo-curable resin composition 10a is applied by the discharge device 12 to form the first photo-curable resin composition layer 11 is performed such that the application thickness T1 on the main surface portion 4b is thicker than the application thickness T2 on the light shielding portion 8, and the application thickness T2 of the first photo-curable resin composition 10a on the light shielding portion 8 is made within the range of the height H1±30% of the stepped portion 8a. In other words, the application thickness T2 and the height H1 of the stepped portion 8a have the following relation.

$$0.7H1 \leq T2 \leq 1.3H1$$

As a result, the first photo-curable resin composition layer 11 can be formed while suppressing the influence of the stepped portion 8a on the light shielding portion 8. In addition, in Step C in which the second photo-curable resin composition 10b is applied to form the second photo-curable resin composition layer 15, it is also possible to form the second photo-curable resin composition layer 15 in which the height difference from the protruding portion 11b is reduced or eliminated.

Here, when the application thickness T2 of the first photo-curable resin composition 10a on the light shielding portion 8 exceeds +30% of the height H1 of the stepped portion 8a, in addition to the protruding portion 11b of the first photo-curable resin composition layer 11 to be formed, a stepwise protrusion appears above the light shielding portion 8, which might hinder the flattening of the second photo-curable resin composition layer 15 in Step C. On the contrary, when the application thickness T2 of the first photo-curable resin composition 10a on the light shielding portion 8 is less than 30% of the height H1 of the stepped portion 8a, a recessed portion lower than the main surface portion 11a might be formed in a portion corresponding to and above the stepped portion 8a of the first photo-curable resin composition layer 11, which might also hinder the flattening of the second photo-curable resin composition layer 15 in Step C.

The above-described ink-jet type discharge device can be suitably used to partially change the application thicknesses T1 and T2 on the main surface portion 4b and the light shielding portion 8 of the protective panel 4. Such a discharge device can apply a predetermined amount of the first photo-curable resin composition 10*a* with a desired thickness and a desired pattern.

Second Examples

Next, second examples in which the first photo-curable resin composition layer 11 is formed on the protective panel 4 by using the present technology will be described. In the present examples, a cover glass was prepared as the protective panel 4, a first photo-cured resin layer made of an ultraviolet-curable resin was formed, and the height (TD waveform) was measured. On the cover glass, a black frame-shaped light shielding portion was formed at a position corresponding to the peripheral edge of the display area of the LCD. An ink-jet type discharge device was used for application of the ultraviolet-curable resin.

The height H1 of the stepped portion of the light shielding portion was formed to be 10 μm. The application thickness T1 of the ultraviolet-curable resin on the main surface of the cover glass was 60 μm. This application thickness T1 is thicker than the application thickness T2 of the ultraviolet-curable resin on the light shielding portion.

Example 2

In Example 2, the application thickness T2 of the ultraviolet-curable resin on the light shielding portion was set to 13 μm. This application thickness T2 is +30% of the height H1 (10 μm) of the stepped portion.

Example 3

In Example 3, the application thickness T2 of the ultraviolet-curable resin on the light shielding portion was set to 10 μm. This application thickness T2 is the same (+0%) as the height H1 (10 μm) of the stepped portion.

Example 4

In Example 4, the application thickness T2 of the ultraviolet-curable resin on the light shielding portion was set to 7 μm. This application thickness T2 is −30% of the height H1 (10 μm) of the stepped portion.

Comparative Example 3

In Comparative Example 3, the application thickness T2 of the ultraviolet-curable resin on the light shielding portion was set to 15 μm. This application thickness T2 is +50% of the height H1 (10 μm) of the stepped portion.

Comparative Example 4

In Comparative Example 4, the application thickness T2 of the ultraviolet-curable resin on the light shielding portion was 5 μm. This application thickness T2 is −50% of the height H1 (10 μm) of the stepped portion.

Figure 13:
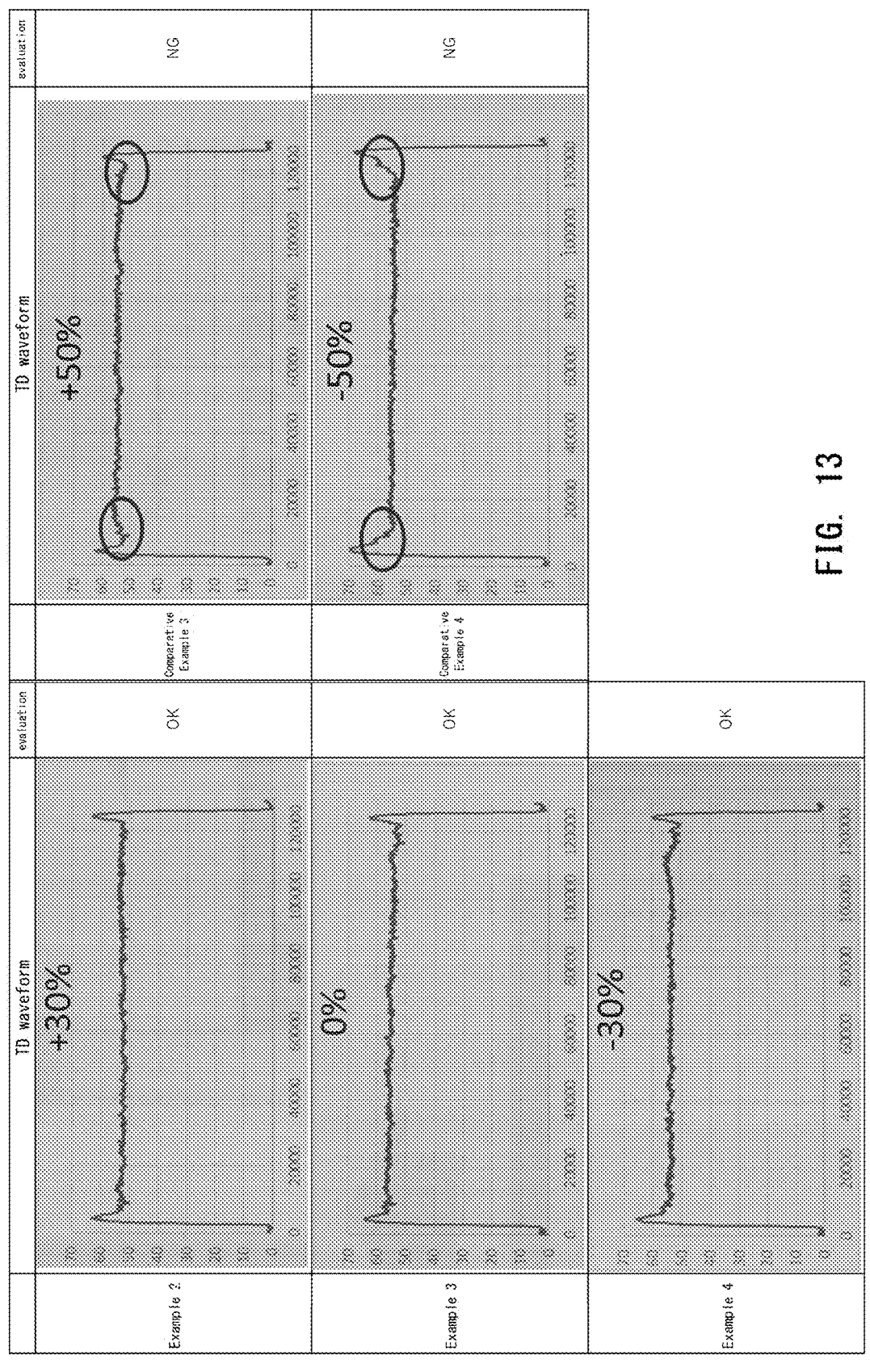
FIG. 13 is a diagram showing the height (TD waveform) of the photo-cured resin layer of the cover glass and the evaluation result with respect to Examples 2, 3, and 4 and Comparative Examples 3 and 4.

FIG. 13 shows the height (TD waveform) of the photo-cured resin layer of the image display device according to Example 2 to 4, Comparative Example 3, and Comparative Example 4.

As shown in FIG. 12, in the cover glasses according to Examples 2 to 4, no stepwise protrusions or recesses appeared in addition to the protruding portion of the first photo-curable resin composition layer, and no effect of the stepped portions was observed. In view of the above, it can be revealed that setting the application thickness of the first photo-curable resin composition on the light shielding portion within the range of ±30% of the height of the stepped portion is effective in forming the flattened first photo-curable resin composition layer.

In the cover glass according to Comparative Example 3, a stepwise protrusion appeared in addition to the protruding portion of the first photo-curable resin composition layer. In the cover glass according to Comparative Example 4, a recessed portion lower than the main surface portion appeared at a portion corresponding to the stepped portion of the first photo-curable resin composition layer. As a result, the cover glasses according to Comparative Examples 3 and 4 could not form the flattened first photo-curable resin composition layer, which might hinder the flattening of the second photo-curable resin composition layer 15 in the subsequent Step C of applying the second photo-curable resin composition and forming the second photo-curable resin composition layer.

REFERENCE SIGNS LIST

1 image display device, 2 image display member, 3 photo-cured resin layer, 4 protective panel, 8 light shielding portion, 9 display portion, 10 photo-curable resin composition, 11 first photo-curable resin composition layer, 11*a* main surface portion, 11*b* protruding portion, 12 discharge device, 12*a* discharge head, 13 first cured resin layer, 15 second photo-curable resin composition layer, 15*a* main surface portion, 18 image display module, 20 protective panel, 20*a* surface, 22 photo-curable resin composition, 23 image display member, 24 application head

The invention claimed is:

1. A method for manufacturing an image display device comprising:

applying a first photo-curable resin composition to a protective panel to form a first photo-curable resin composition layer, the first photo-curable resin composition layer having a first main surface portion and a first protruding portion that rises higher than the first main surface portion along an outer edge of the first main surface portion such that the entire first main surface portion is a recessed portion surrounded by the first protruding portion;

irradiating the first photo-curable resin composition layer with curing light to form a first cured resin layer;

applying a second photo-curable resin composition, which has a viscosity higher than a viscosity of the first photo-curable resin composition, to the first cured resin layer by an ink-jet discharge device to form a second photo-curable resin composition layer having: a second main surface portion and a second protruding portion positioned on an outer edge of the second main surface portion, the second photo-curable resin composition layer having a reduced or eliminated height difference between the second main surface portion and the second protruding portion, compared with a height difference between the first main surface portion and the first protruding portion;

laminating the protective panel and an image display member via the second photo-curable resin composition layer; and irradiating the second photo-curable resin composition layer with curing light, wherein the second photo-curable resin composition is applied by the ink-jet discharge device from the first main surface portion surrounded by the first protruding portion of the first cured resin layer up to an outer slope of the first protruding portion of the first cured resin layer while controlling an application amount of the second photo-curable resin composition such that an application amount on a top of the first protruding portion is smaller than an application amount on the outer slope, and wherein after applying the second photo-curable resin composition by the ink-jet discharge device and before laminating the protective panel and image display member, the second photo-curable resin composition layer is irradiated with curing light and cured such that a shape of the second photo-curable resin composition layer is maintained.

2. The method according to claim 1, wherein the first photo-curable resin composition has a viscosity of from 3 to 1,000 mPa*s.

3. The method according to claim 1, wherein the first photo-curable resin composition is applied to an entire surface of the protective panel.

4. The method according to claim 1, wherein the first photo-curable resin composition layer is temporarily cured before the applying of the second photo-curable resin composition.

5. The method according to claim 1, wherein the first photo-curable resin composition layer is fully cured before the applying of the second photo-curable resin composition.

6. The method according to claim 1, wherein the first photo-curable resin composition is applied a plurality of times.

7. The method according to claim 1, wherein the second photo-curable resin composition is applied a plurality of times.

8. The method according to claim 1, wherein the protective panel comprises: a main surface portion, a light shielding portion in a peripheral edge portion of the protective panel; and a stepped portion between the light shielding portion and the main surface portion, and wherein when the first photo-curable resin composition is applied, an application thickness of the first photo-curable resin composition on the main surface portion of the protective panel is thicker than an application thickness of the first photo-curable resin composition on the light shielding portion of the protective panel, and the application thickness of the first photo-curable resin composition on the light shielding portion of the protective panel is within a range of a height of the stepped portion ±30%.

* * * * *